United States Patent [19]

Dietz

[11] 4,428,654
[45] Jan. 31, 1984

[54] METHOD AND APPARATUS FOR SIMULTANEOUSLY EVALUATING DIFFERENT SPECTRAL FREQUENCIES FROM DIFFERENT SCENE ZONES

[75] Inventor: Milton S. Dietz, Lexington, Mass.

[73] Assignee: Polaroid Corporation, Cambridge, Mass.

[21] Appl. No.: 255,694

[22] Filed: Apr. 20, 1981

[51] Int. Cl.³ .................... G03B 7/08; G03B 15/03
[52] U.S. Cl. .................................. 354/413; 354/482
[58] Field of Search .................. 354/27–30, 354/31, 33, 139, 149, 32, 34, 35, 126, 42, 49, 59; 356/222, 225; 250/482.1; 350/1.1, 313, 315, 316, 317

[56] References Cited

U.S. PATENT DOCUMENTS

| | | | |
|---|---|---|---|
| 2,086,791 | 7/1937 | Dresler | 88/1 |
| 3,500,730 | 3/1970 | Matsubara et al. | 95/10 |
| 3,580,149 | 5/1971 | Fujisawa | 95/11 |
| 3,709,615 | 1/1973 | Blakeslee et al. | 356/224 |
| 3,780,631 | 12/1973 | Schulman | 95/10 C |
| 3,903,413 | 9/1975 | Manning | 250/226 |
| 4,095,241 | 6/1978 | Matsumoto | 354/31 |
| 4,160,588 | 7/1979 | Beach | 354/31 |
| 4,315,675 | 2/1982 | Johnson | 354/27 X |

*Primary Examiner*—William B. Perkey
*Attorney, Agent, or Firm*—Leslie J. Payne

[57] ABSTRACT

A method and an apparatus are disclosed for controlling exposure whereby scene radiation is generally simultaneously evaluated from one zone of the scene in a spectrally different manner from another zone thereof so as to define the exposure in accordance with selected frequencies from the selected zones.

18 Claims, 3 Drawing Figures

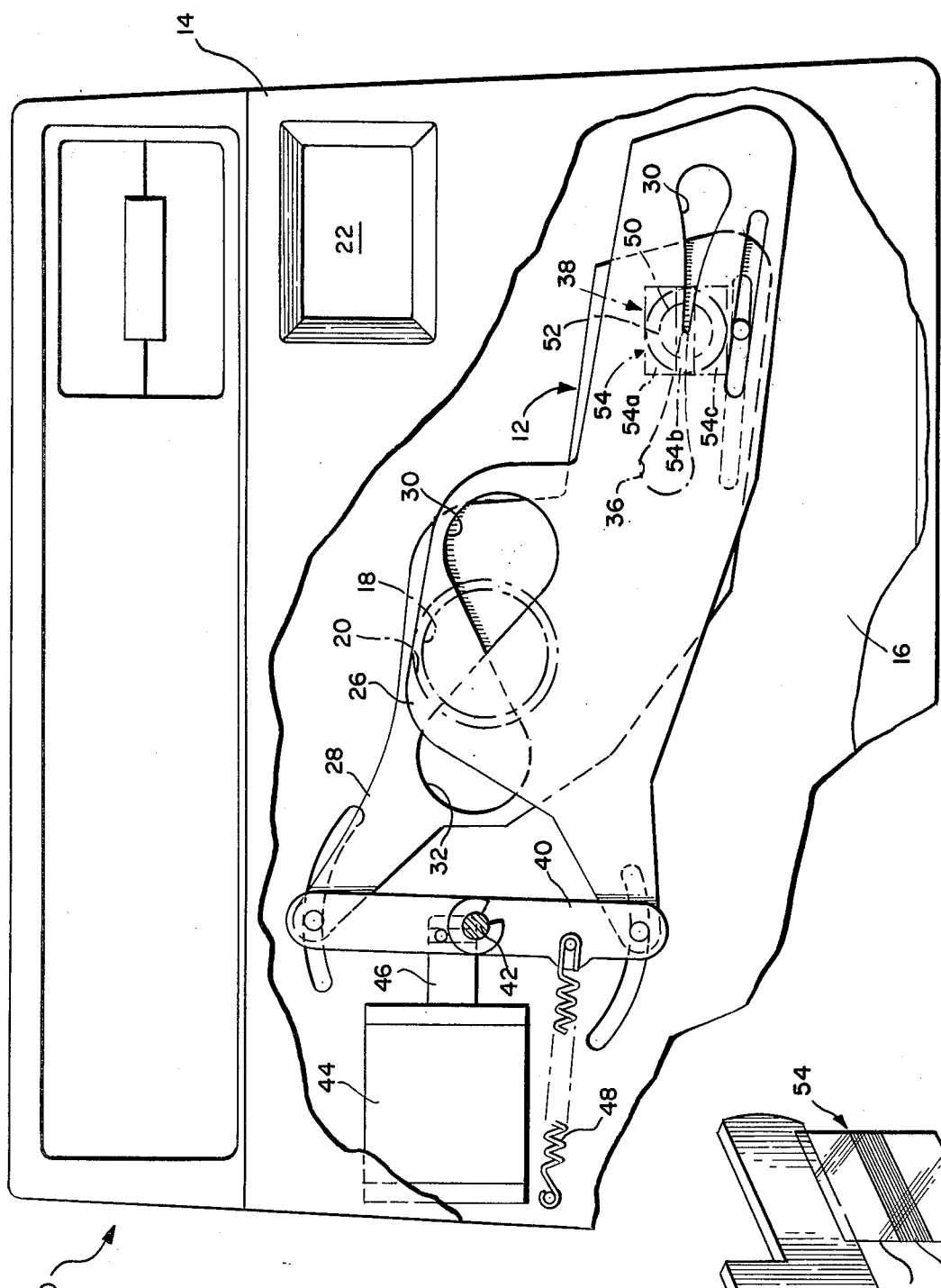
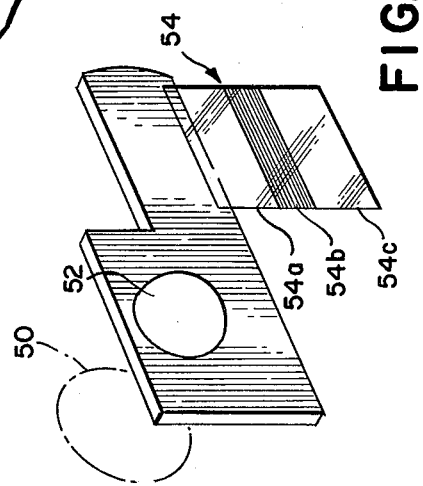

METHOD AND APPARATUS FOR SIMULTANEOUSLY EVALUATING DIFFERENT SPECTRAL FREQUENCIES FROM DIFFERENT SCENE ZONES

BACKGROUND OF THE INVENTION

This invention relates generally to the field of photography and, more particularly, to an improved exposure control method and apparatus for evaluating different spectral frequencies from different zones of the scene to be evaluated.

Automatic light responsive exposure control systems are well-known in the photographic arts. One such automatic exposure control system employs scanning type shutter blades. Exemplary scanning shutter blades usable in such systems are disclosed generally in U.S. Pat. No. 3,942,183, issued Mar. 2, 1976, to George D. Whiteside; and U.S. Pat. No. 4,104,653, issued Aug. 1, 1978, to Bruce K. Johnson et al., all of which are presently assigned in common with the present application. As described in these patents, cooperating pairs of taking or primary, and secondary or photocell apertures are formed in the shutter blades. These aperture pairs cooperate respectively for blocking and unblocking scene light through an exposure opening to a film plane, and through a photocell opening to a light sensing device or photoresponsive cell used for controlling blade positioning. During the exposure cycle, the photocell apertures operate in conjunction with the photocell and a control circuit to define both the taking aperture values achieved and the exposure interval as a function of the amount of scene radiation received through the photocell apertures.

It will be understood that the typical photocell tends to react to a band of certain spectral frequencies which include infrared (IR) frequencies. This is especially so when the photocell is of the silicon type, because it tends to be red (IR) sensitive. Therefore, for optimizing photographic quality when using systems of the type noted, a spectral correction filter can be employed in the photocell's optical path. Such filter correlates the spectral sensitivity curve of the photoresponsive element more closely with that of the eye. Ordinarily then, use is made of a spectral correction filter having peak absorption in the near-infrared region and high transmission in the visual region.

While use of infrared spectral filters serve satisfactorily, complications can arise with its usage. This is so particularly in flash exposures when reflectivities of different objects to be photographed exhibit widely disparate values. Partly as a result of this, it has been found advantageous to evaluate infrared frequencies in flash exposures. Such approach is disclosed in copending and commonly assigned application Ser. No. 156,198, entitled "Method and Apparatus for Selectively Positioning Spectral Filter", filed June 3, 1980, by Bruce K. Johnson now U.S. Pat. No. 4,315,675, issued Feb. 16, 1982. In particular, an exposure control system is disclosed with artificial flash or strobe lighting associated with a pair of photoresponsive regions. One region evaluates infrared spectral frequencies for the strobe mode and another region evaluates visible spectral frequencies in the ambient mode. For effectuating such switching, the shutter mechanism is provided with a unique photocell aperture arrangement which, during shutter scanning, alternatively directs scene radiation to one or the other photoresponsive region depending on the ambient light conditions.

This approach represents a significant advance in providing improved exposure under many different lighting conditions. However, with this latter approach, the dynamics of the blade mechanism must be relatively accurately controlled for insuring the desired switching of the evaluation of different spectral frequencies. Also, with such a system, the blocking visible filter (i.e., passes infrared frequencies) is controlling passage of scene radiation to the photocell for a relatively significant portion of the time the photocell circuit is integrating the scene radiation. Hence, when the infrared frequencies are being evaluated, there is a tendency for underexposure, particularly when the scene contains plants, trees, grass, etc. Thus, it is desirable to limit, as much as possible, the time interval the infrared is being evaluated. Moreover, with the foregoing system it is highly desirable to accurately time firing of the flash when the infrared is being evaluated.

It is apparent, therefore, that the cooperation of the photocell apertures and the scanning dynamics of the blades as well as the timing of the flash firing must be accurately controlled. Otherwise, the desired switching of scene radiation evaluations for controlling exposure can be adversely affected.

Moreover, such light detecting devices of the above kind generally comprise one or more photovoltaic or photoresistive transducers associated with an optical system of the photocell. Such a light detecting device, however, reacts to the average brightness of a field of view. A difficulty with using the average field brightness is that it differs from the brightness of particular portions of the field, such as the subject of interest in most scenes. Hence, when the brightness of peripheral or upper zones of the field contrasts with the brightness of central or lower zones of the field, an exposure meter having a single photocell indicates an incorrect exposure for the more important subject usually in the center of the scene. Thus, a unicell photometer is less than satisfactory for certain photographic situations.

Approaches have been made for correcting the foregoing drawback. One is to employ a multicell photometer. Such a photometer evaluates and weighs the radiation from different zones of the scene to be evaluated and photographed.

Another approach is disclosed in commonly assigned and copending application Ser. No. 219,930, entitled "Light Detecting Apparatus for Photographic Camera", by Bruce K. Johnson, and filed Dec. 24, 1980 and now U.S. Pat. No. 4,345,828. In this approach, an intricate photocell aperture arrangement on the blades cooperate with a single photocell to evaluate at least partially different portions of the scene. In addition, essentially infrared evaluation from a given portion of the scene is used for flash contributions to the photograph whereas visible light evaluation from at least a partially different portion of the scene is used to control the ambient contribution. However, as with the exposure control system described in the previously noted application Ser. No. 156,198, the camera arrangement requires precise, intricate manipulation of the photocell aperture arrangement dynamically formed on the blades during scanning, as well as accurate timing of the firing of the flash. It becomes advantageous, therefore, to reduce the amount of time, labor and effort required to insure such intricate cooperation and timing.

SUMMARY OF THE INVENTION

In accordance with the present invention, there is provided an exposure control system for use in an image recordable apparatus having means for directing scene radiation along a given path to a focal plane. In such systems, evaluating means are provided for evaluating the scene radiation during an evaluation period. Means are provided for controlling transmission of scene radiation along the path to the focal plane in response to the evaluation by the evaluating means so as to define the exposure of such scene radiation at the focal plane.

In an illustrated embodiment, the evaluating means includes means for generally simultaneously evaluating the radiation from one zone of the scene in a spectrally different manner from another zone thereof so as to define the exposure in accordance with selected frequencies from selected zones.

In another illustrated embodiment, the evaluating means comprises a spectral filtering arrangement. Included in the spectral filtering arrangement is one spectral filter which allows evaluation of generally infrared frequencies from a portion of the scene to be evaluated. Also included is at least a second spectral filter which allows substantially exclusive evaluation of selected visible spectral frequencies from another portion of the scene.

Among the objects of the invention are, therefore, the provision of an improved exposure control system for use in an image recordable apparatus, wherein different zones of the scene have the spectral frequencies therefrom evaluated differently; the provision of an improved exposure control system having generally simultaneous evaluation of different spectral frequencies from different zones of the scene for controlling exposure; the provision of an improved image recordable apparatus having an improved exposure control system of the kinds described above; the provision of an improved exposure control system having a spectral filtering arrangement having spectral regions which spectrally filter different first and second sets of spectral frequencies from different zones; and the provision of an improved method of generally simultaneously evaluating spectral scene frequencies by evaluating different frequencies from generally different zones of the scene to be evaluated.

Other objects and further scope of applicability of the present invention will become apparent from the detailed description to follow when taken in conjunction with the accompanying drawings in which like parts are designated by like reference numerals throughout the several views.

BRIEF DESCRIPTION OF THE DRAWINGS

FIG. 1 is an elevational view of a photographic apparatus, partly in section, showing aspects of the exposure control system of this invention;

FIG. 2 is an enlarged perspective view showing details of the improved exposure control system of this invention.

DETAILED DESCRIPTION

Figure 3:
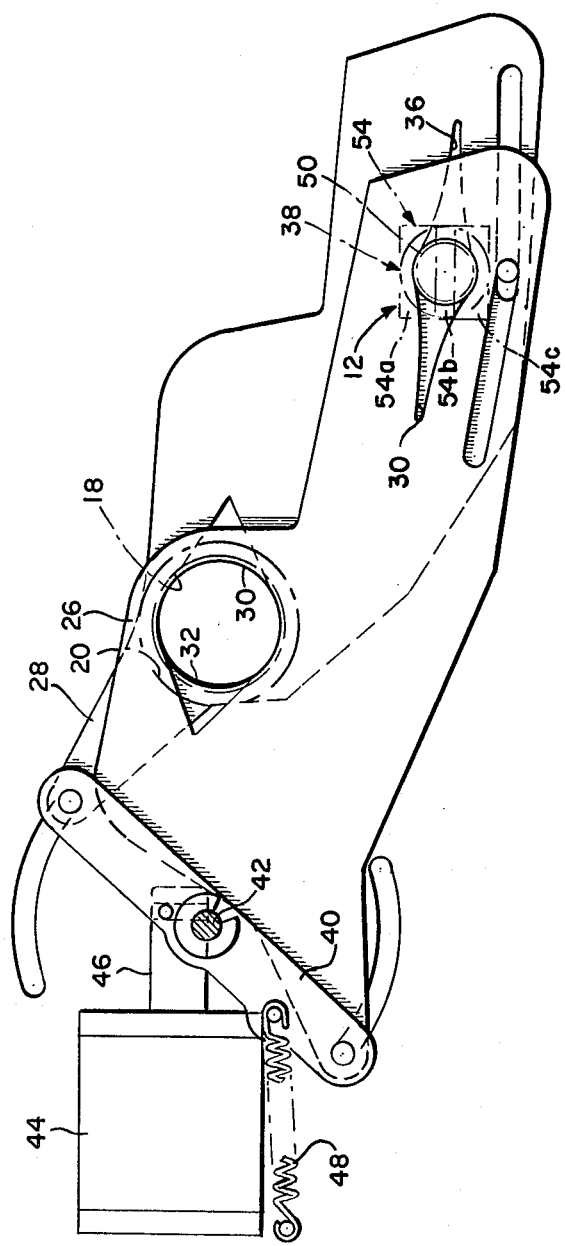
FIG. 3 is an elevational view of the shutter blade mechanism in an operative scene light admitting condition.

FIG. 1 illustrates a photographic camera apparatus 10 of the self-developing kind having an improved exposure control system 12. Stationarily affixed in and to a camera housing 14 is a baseblock casting 16. Centrally formed in the casting 16 is a light exposure opening 18 constructed for defining the maximum available exposure aperture of the system 12, as well as for allowing scene radiation to reach an image recordable photographic film unit (not shown) of a film pack (not shown). Examples of film packs containing multiple film units of the self-developing type usable in a camera of the kind indicated above are described in U.S. Pat. Nos. 3,543,662; 3,705,542; 3,748,984 and 3,779,770. These film packs are of the kind manufactured and sold by the Polaroid Corporation, Cambridge, Mass. Each of the film units of the film pack is successively positioned at the focal plane (not shown) of the camera 10.

Connected to and supported by a front wall of the camera housing 14, in overlying relationship to the light exposure opening 18, is a fixed focus objective lens assembly 20. The lens assembly 20 permits image carrying rays passing therethrough to follow an optical path. This path allows the rays to be reflected from a mirror (not shown) housed in the camera housing 14 to successive ones of the uppermost film units located at a focal plane.

Connected to the front face of the camera housing 14 is a viewing window lens 22. This window lens 22 in conjunction with the camera viewfinder system (not shown) permits viewing and framing of a subject to be photographed. The viewfinder system is structured to have a field of view coextensive generally with that of the camera's field of view for facilitating camera aiming and picture framing.

Continued reference is made to FIG. 1 for depicting the improved exposure control system 12. Included in the system 12 is a blade mechanism comprising a pair of scanning shutter type blades 26 and 28. This mechanism does not, per se, form an aspect of this invention. In this regard, reference is made to commonly assigned U.S. Pat. No. 4,040,072 for a more complete description of such a blade mechanism. Thus, only a description of its construction and operation necessary for a complete understanding of this invention is given. In such mechanism, the shutter blades 26, 28 are supported for scanning type reciprocatory movement on and by the baseblock casting 16, and are positioned intermediate the lens assembly 20 and exposure opening 18.

Formed in the scanning shutter blades 26, 28 is a pair of taking or scene light admitting primary apertures 30, 32; respectively. These primary apertures 30, 32, during blade scanning movement, coincide in progressively overlapping relationship with respect to both the light exposure opening 18 and the lens assembly 20. When so coinciding, they define progressively increasing taking aperture areas which vary as a function of blade positioning. Basically, the foregoing provide means for controlling transmission of scene radiation along an optical path to the focal plane for defining an exposure interval during a scene radiation evaluating period.

Formed in the shutter blades 26, 28 is a pair of photocell sweep apertures 36. During scanning, the photocell apertures overlap progressively for defining a progressively increasing effective photocell aperture area. This change is effective for controlling the passage of scene radiation along a path of scene light to a light detecting station 38 which will be described in more detail hereinafter.

Distal ends of the shutter blades 26, 28 are pivotally connected to distal ends of a walking beam 40. In turn, the walking beam 40 is pivotally connected to the baseblock casting 16 by a pivot pin 42. Distal ends of the walking beam 40 have pin members extending through respective circular openings formed in the respective shutter blades 26, 28. These pin members slidably engage respective arcuate slots formed in the baseblock casting 16 for prohibiting shutter blade disengagement.

Displacement of the shutter blades 26, 28 is provided, in part, by the solenoid 44. Included in the solenoid 44 is an internally arranged and movable plunger unit 46. This plunger unit 46 is affixed to the walking beam 40 by means of a pivot pin. Longitudinal displacement of the plunger unit 46 is effective for rotating the walking beam 40 about the pivot pin 42. Solenoid energization retracts the plunger unit 46 into the solenoid housing, thereby driving the shutter blades 26, 28 to a scene light blocking condition (FIG. 1). In such condition, the taking apertures 30, 32 do not overlap. A biasing spring 48 serves normally to force the plunger unit 46 outwardly from the solenoid housing. This tends to rotate the walking beam 40 in a counterclockwise direction. Such rotation follows, of course, solenoid deenergization. Thus, the biasing spring 48 urges continuously the taking apertures 30, 32 and the set of photocell apertures 36 to positions defining their effective aperture areas. Towards this end, one end of the biasing spring 48 is affixed to the casting 16 while its opposite end is attached to the walking beam 40. Of course, solenoid reenergization overcomes the biasing effect of the spring 48 for terminating an exposure cycle or interval. For a more complete description of the foregoing structure and function, reference is made to the last-noted patent. The foregoing provides means for controlling transmission of the path of scene radiation to the film plane and the light detecting station 38 for controlling shutter blade displacement so as to define the exposure interval in a manner to be described.

Referring back to the light detecting station 38, it includes a photocell assembly of the silicon photodiode type having a photocell detector 50, FIG. 2, and a lens assembly 52. Cooperating with the photodetector 50 is a light integrating circuit (not shown). This circuit in a well-known manner controls energization of a solenoid 44. Reenergization of the solenoid 44 terminates the exposure interval of the shutter blades 26, 28, as a function of the time integration of scene radiation intensity incident on the photodetector 50. The amount and character of such incident scene radiation are controlled by the photocell sweep apertures 36, the photocell lens assembly 52 and a spectral filtering assembly 54. The foregoing provide means for generally simultaneously evaluating scene radiation from one zone of the scene in a spectrally different manner from another zone so as to define the exposure in accordance with the selected frequencies from selected zones. In other words, the foregoing provide means for generally simultaneously evaluating different sets of spectral frequencies from correspondingly different zones of the scene so as to define exposure in response to scene evaluation weighted in accordance with selected frequencies from selected zones.

Although this embodiment is described for use with non-reflex type cameras, the intended scope of this invention is, of course, by no means so limited. Thus, cameras of the well-known reflex type, such as described in U.S. Pat. No. 3,672,281, entitled "Reflex Camera", by Edwin H. Land, commonly assigned herewith may be equally suitable for embodying the exposure control system of this invention.

Power for the camera apparatus 10 comes from a battery (not shown) housed in the film pack. For conserving battery power, the solenoid 44 should not be continuously energized while maintaining the shutter blades 26, 28 in their scene light blocking portion. Towards this end, a latch mechanism (not shown) is provided. Details regarding the latching mechanism as well as its mode of operation in conjunction with the shutter blade operation do not, per se, form an aspect of this invention. Therefore, reference is made to U.S. Pat. No. 4,040,072 for a more complete description thereof.

The strobe unit 56 and its operation do not, per se, form an aspect of this invention. Hence, a detailed description thereof is dispensed with. However, for purposes of understanding this invention, only a brief description of its construction and function are given. For a more detailed description, reference is made to copending application Ser. No. 156,198, entitled "Method and Apparatus for Selectively Positioning Spectral Filter", filed June 3, 1980, by Bruce K. Johnson, and now U.S. Pat. No. 4,315,675, and commonly assigned herewith. The strobe unit 56 can be a quench type fill-in flash unit with its pulse of illumination being of limited maximum duration during the exposure.

Turning back to the light detecting station 38, reference is now made to FIG. 2 for better describing the photodetector 50, photocell lens assembly 52, and the spectral filter assembly 54. For controlling scene radiation evaluation, it is apparent that the cooperating photocell apertures 36 are brought into scene light transmitting relationship to the foregoing components of the light detecting station. The lens assembly 52 serves, of course, to direct the scene light onto the photodetector 50.

Positioned in front of the lens assembly 52 is the spectral filtering assembly 54 of the present invention. In this embodiment, the spectral filter assembly 54 includes three spectral filtering zones or segments 54a, 54b, and 54c. They are arranged in a horizontal array (FIG. 2) and spaced from the lens assembly 52 by an appropriate distance for purposes to be described presently. Both the upper and lower filtering segments 54a through 54c, respectively, substantially block infrared spectral frequencies, particularly in the near IR range, while passing substantially visible frequencies (e.g., 400-700 nm). The central segment 54b acts in an opposite fashion than the other segments namely by substantially passing infrared spectral frequencies particularly in the near-infrared range, (e.g., 700-1200 nm), while substantially blocking visible frequencies. These spectral filtering segments 54a-c are arranged to divide the field of view of incoming scene radiation to the photodetector 50, into three generally preselected zones. Thus, scene radiation coming from each of these zones is spectrally filtered in accordance with the characteristics of the corresponding spectral filtering segments 54a-c. The filtering segment 54a blocks the infrared frequencies and will generally block scene radiation from a zone of the scene to be evaluated and photographed which includes the foreground, that is the lower portion of a photograph on the film format. Thus, the spectral filtering segment 54a is beneficial in spectrally filtering scenes having relatively high infrared content in the foreground. Such scenes would include grass, plants, etc. in the foreground. The spectral filter segment 54c would spectrally filter scene radiation so as to exclude infrared radiation from the background of the scene to be evaluated and photographed. This is, of course, beneficial in scenes having relatively high infrared content in the background, such as scenes having trees or skylight. It will be noted that although in this embodiment both spectral filtering segments 54a and 54c have the same spectral filtering characteristics, they can have different spectrally filtering characteristics. Stated otherwise, they could pass spectral frequencies different from the other.

Now referring to the central filtering segment 54b it has been added primarily for flash exposures (e.g., where the contribution of the flash as opposed to ambient is relatively controlling). As noted in commonly assigned and copending application Ser. No. 156,198, filed June 3, 1980, by Bruce K. Johnson, and now U.S. Pat. No. 4,315,675, it has been found advantageous to generally evaluate only infrared radiation frequencies during flash conditions. Towards this end, the central spectral filtering segment 54b has been added. The segmemt 54b is spaced from the photocell lens assembly 52 by a distance so that at least a portion of the subject to be photographed in a central zone of the scene will be spectrally filtered. For instance, this central zone could include a subject's face as well as some of the subject's clothing.

It is pointed out that the spectral filtering segements 54a-c will essentially aim the scene radiation from corresponding portions (foreground, subject, background) of the scene to be evaluated to the photodetector 50. The effectiveness of the aiming is dependent upon the distance the spectral filtering arrangement 54 is from the front of the photocell lens. In other words, if the spectral filtering arrangement 54 is closer, then there will be a relatively slight overlapping of the noted three zones. Alternatively, if the filtering arrangement 54 is farther from the lens assembly 52, then the aiming of the three zones of spectral frequencies onto the photodetector 50 can be more selective. That is, the degree of overlapping of the three zones of spectrally filtered scene radiation can be minimized. Also, it is pointed out that each of the spectral filtering segments 54a-c can spectrally filter a set or range of spectral frequencies, which is different from the others, but which are inclusive of frequencies in the other set. For instance, there can be a slight overlapping of the frequencies in each of the sets.

Although the illustrated embodiment of the spectral filtering arrangement 54 shows an array of three generally rectangular and horizontally arranged spectral filtering segments 54a-c, this invention envisions, of course, that any number of spectral filtering segments may be utilized. Of course, the number of filtering segments will depend on the number of zones it is desired to spectrally filter. Additionally, the spectral filtering segments can have other configurations and orientations than those shown.

The foregoing provide means for simultaneously evaluating the radiation from one zone of the scene in a different manner from another zone thereof so as to define the exposure in accordance with selected frequencies from selected zones. This invention also makes provision for evaluating radiation from each zone along different paths and means for spectrally filtering at least one of the paths different from another.

It is believed that the operation of the foregoing exposure control system is apparent from the above. To supplement such operational description, however, the following is set forth.

Reference is made initiallly to FIG. 1, wherein the shutter blades 26, 28 are shown in the scene light blocking condition. In this condition, the taking apertures 30, 32 are not in overlapping coincidence. Thus, no scene light is incident on the focal plane. When the exposure interval is commenced, as is described more fully in the last-noted patent, the shutter blades 26, 28 are driven, under the influence of the biasing spring 48, so that the taking apertures 30, 32 are in their scene light admitting conditions (FIG. 3).

During such shutter scanning, the photocell apertures 36 progressively, overlappingly cooperate for forming distinct photocell aperture areas which change as a function of blade scanning. The coinciding photocell apertures 36 are effective for controlling scene radiation passing through the spectral filtering assembly 54 and the lens element 52 to the photodetector 50. It is apparent that the scene radiation evaluated in the central zone will be infrared frequencies, whereas the remaining peripheral frequencies evaluated will be visible frequencies. This is due to the noted arrangement of spectral filtering segments 54a-c.

Once the scene radiation evaluated by the light integrating circuit reaches a predetermined level, (depending on scene lighting conditions) the strobe unit 56 is energized and fired. In turn, the pulse of illumination is evaluated by the light detecting station 38 until the scene radiation evaluated by the integrating circuit reaches another predetermined level which causes the solenoid to be energized. Energization causes withdrawal of the plunger unit 46 and thereby causing retraction of the blades 26, 28 from their scene light admitting condition to their scene light blocking condition for terminating the exposure interval. It will be understood, of course, that the force of the biasing spring 48 is overcome during such retraction. Retraction continues until the latching mechanism (not shown) becomes effective for retaining the blades in their scene light blocking condition (FIG. 1).

Since certain changes may be made in the above-described method and apparatus without departing from the scope of the invention herein involved, it is intended that all matter contained in the description or shown in the accompanying drawings shall be interpreted as illustrative and not in a limiting sense.

What is claimed is:

1. In an exposure control system for use in an image recordable apparatus having means for directing scene radiation along a given path to a focal plane, means for evaluating the scene radiation during an evaluation period, means for controlling transmission of scene radiation along the path to the focal plane in response to the evaluation by said evaluating means so as to define the exposure of each scene radiation of the focal plane, the improvement comprising:

said evaluating means including means for generally simultaneously evaluating the radiation for a considerable duration of the evaluation period from one zone of said scene so as to substantially block infrared frequencies while passing visible frequencies and evaluating the radiation from another zone thereof so as to transmit substantially infrared frequencies while blocking visible frequencies so as to define said exposure in accordance with selected frequencies from selected zones.

2. The system of claim 1 wherein said evaluating means includes a photodetector, a photocell lens for directing scene radiation to said photodetector, and a filtering arrangement having spectral filtering regions with different spectral characteristics, said filtering arrangement being positioned adjacent a surface of said photocell lens which faces away from said photodetector and is spaced a distance therefrom so that said regions respectively filter radiation from generally different ones of said zones.

3. The system of claim 2 wherein said evaluating means includes means for defining a single photocell aperture cooperable with said filtering arrangement and wherein one of said zones includes a central portion of the scene to be evaluated and another of said zones corresponds to at least a portion of remaining areas of the scene to be evaluated.

4. The system of claim 2 wherein said filtering arrangement includes first, second and third spectral regions, said first and third spectral regions spectrally filtering scene radiation so as to block substantially infrared frequencies and said second region spectrally filtering scene radiation so as to block substantially visible radiation.

5. In an exposure control system for use in an image recordable apparatus having means for directing scene radiation along a given path to a focal plane, means for evaluating the scene radiation during an evaluation period, means for controlling transmission of scene radiation along the path to the focal plane in response to the evaluation by said evaluating means so as to define the exposure of such scene radiation at the focal plane, the improvement comprising:
said evaluating means including means for generally simultaneously evaluating a set of infrared spectral frequencies substantially exclusive of visible frequencies and a set of visible spectral frequencies substantially exclusive of infrared frequencies respectively from correspondingly different zones of the scene substantially throughout the evaluation period so as to define said exposure in response to scene evaluation weighted in accordance with the selected infrared and visible frequencies from selected zones.

6. The system of claim 5 wherein said evaluating means includes a photodetector, a photocell lens for directing scene radiation to said photodetector, and a filtering arrangement having different spectral filtering regions with infrared and visible characteristics, said filtering arrangement being positioned adjacent a surface of said photocell lens which faces away from said photodetector and is spaced a distance therefrom so that said regions respectively transmit infrared and visible radiation from generally different ones of said zones.

7. The system of claim 6 wherein one of said zones includes a central portion of the scene to be evaluated and another of said zones corresponds to at least a portion of remaining areas of the scene to be evaluated.

8. The system of claim 6 wherein said filtering arrangement includes first, second and third spectral regions, said first and third spectral regions spectrally filtering scene radiation so as to block substantially infrared frequencies and said second region spectrally filtering scene radiation so as to block substantially visible radiation.

9. The system of claim 6 wherein said filtering arrangement includes first and second spectral regions, which spectrally filter different first and second sets of spectral frequencies, operatively positioned to respectively spectrally filter radiation from first and second zones of the scene to be evaluated; said first set of predetermined frequencies is substantially infrared frequencies, and said second set of predetermined frequencies is substantially visible frequencies.

10. The system of claim 9 wherein said first zone includes a central portion of the scene to be evaluated and said second zone corresponds to at least a portion of remaining areas of the scene to be evaluated.

11. In an exposure control system for use in an image recordable apparatus having means for directing scene radiation along a given path to a focal plane, means for providing a pulse of artificial illumination during an exposure, means for evaluating the scene radiation during an evaluation period, and means for controlling transmission of scene radiation along the path to the focal plane in response to the evaluation by said evaluating means for defining the exposure of such scene radiation at the focal plane, the improvement comprising:
said evaluating means including means for generally simultaneously evaluating the radiation from one zone of said scene for a significant portion of the evaluation period commencing generally at the beginning of said period in a spectrally different manner from another zone thereof so as to define said exposure in accordance with selected frequencies from selected zones, whereby the effects of the artificial illumination on a subject which affect exposure are minimized, said another zone includes an area of said scene expected to be particularly responsive to flash illumination, and said evaluating means includes means for generally excluding evaluation of visible light from said another zone while including visible light in the evaluation of said one zone.

12. The system of claim 11 wherein said evaluating means includes a photodetector, a photocell lens for directing scene radiation to said photodetector, and a filtering arrangement having spectral filtering regions with different spectral characteristics, said filtering arrangement being positioned adjacent a surface of said photocell lens which faces away from said photodetector and is spaced a distance therefrom so that said regions respectively filter radiation from generally different ones of said zones.

13. The system of claim 12 wherein one of said zones includes a central portion of the scene to be evaluated and another of said zones corresponds to at least a portion of remaining areas of the scene to be evaluated.

14. The system of claim 12 wherein said filtering arrangement includes first, second and third spectral regions, said first and third spectral regions spectrally filtering scene radiation so as to block substantially infrared frequencies and said second region spectrally filtering scene radiation so as to block substantially visible radiation.

15. A method of exposing an image recordable medium to a scene comprising the steps of:
evaluating a first set of generally infrared spectral frequencies from a first predetermined portion of the scene for a given time period which is a considerable duration of a evaluation period;
evaluating at least a different second set of generally visible spectral frequencies from a second predetermined portion of the scene for a time period substantially equal to said given time period; and
exposing the image recordable material in accordance with the combined evaluation of the first and second sets of spectral frequencies.

16. A method of exposing an image recordable medium to a scene comprising the steps of:
  evaluating a first set of spectral frequencies during an evaluation period generally exclusive of visible spectral frequencies and generally inclusive of infrared from a first predetermined portion of the scene for a duration which is substantially throughout the evaluation period;
  generally simultaneously evaluating at least a different second set of spectral frequencies during the evaluation period generally inclusive of visible frequencies and generally exclusive of infrared frequencies from a second predetermined portion of the scene for said duration; and
  transmitting radiation from said scene to said image recordable medium in an amount in accordance with both said evaluating steps taken during the evaluation period.

17. The method of claim 15 or 16 wherein the first portion includes a central portion of the scene to be evaluated and the second portion includes at least a portion of the remaining area of the scene to be evaluated.

18. In an exposure control system for use in an image recordable apparatus having means for directing scene radiation along a given path to a focal plane, means for evaluating the scene radiation during an evaluation period, means for controlling transmission of scene radiation along the path to the focal plane in response to the evaluation by said evaluating means so as to define the exposure of such scene radiation at the focal plane, the improvement comprising:

said evaluating means including means for generally simultaneously evaluating sets of infrared and visible spectral frequencies respectively from correspondingly different zones of the scene so as to define said exposure in response to scene evaluation weighted in accordance with the selected infrared and visible frequencies from selected zones;

said evaluating means includes a photodetector, a photocell lens for directing scene radiation to said photodetector, and a filtering arrangement having spectral filtering regions with different spectral characteristics, said filtering arrangement being positioned adjacent a surface of said photocell lens which faces away from said photodetector and is spaced a distance therefrom so that said regions respectively filter radiation from generally different ones of said zones;

said filtering arrangement includes first, second and third spectral regions, said first and third spectral regions spectrally filtering scene radiation so as to block substantially infrared frequencies and said second region spectrally filtering scene radiation so as to block substantially visible radiation; and said first and third regions spectrally filter scene radiation from respective first and third regions, wherein said first region includes the scene foreground and said third region includes the scene background, and said second region spectrally filters scene radiation from a second region which includes a generally central portion of the scene to be evaluated.

* * * * *